Aug. 21, 1945.   E. HARDESTY   2,383,191
APPLICATION OF CERAMIC COLOR
Original Filed Aug. 30, 1941
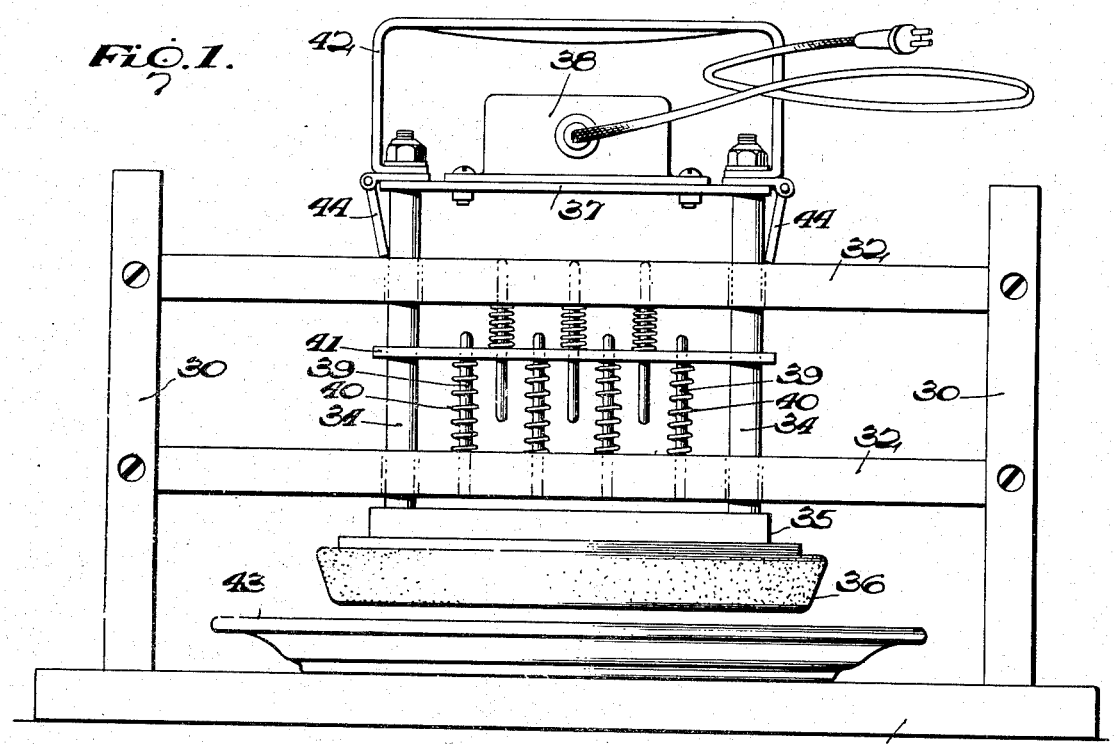
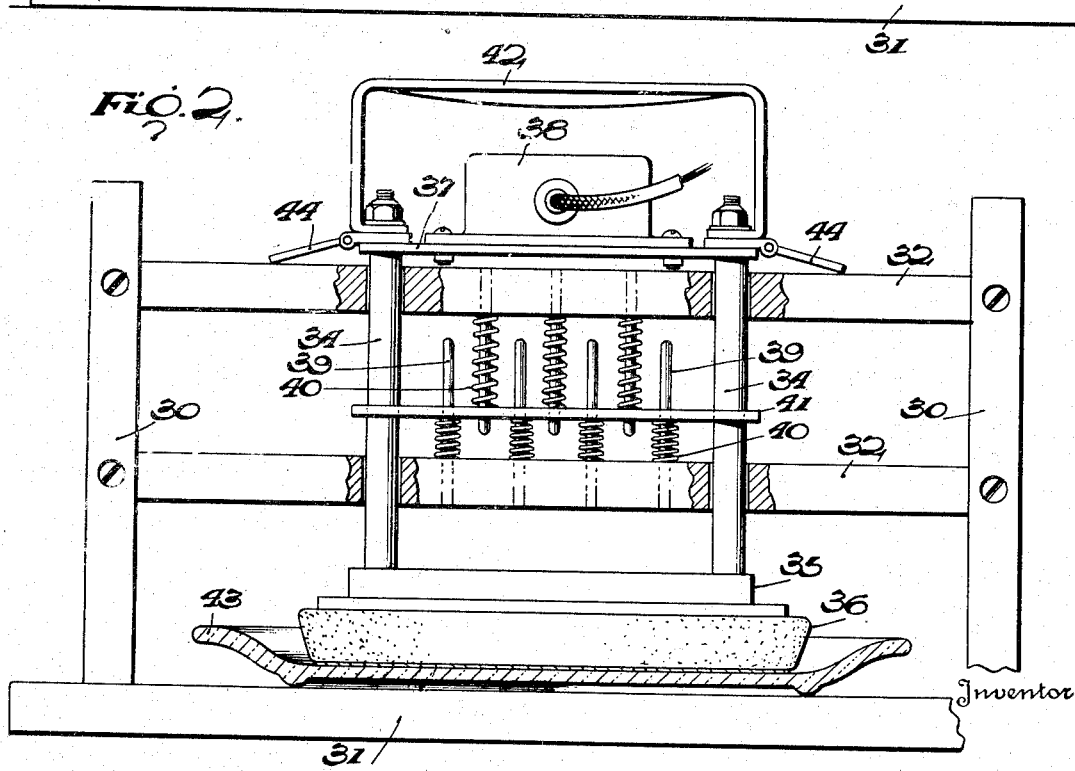
Inventor
Eugene Hardesty
By Richard L. Underwood
Attorney Patented Aug. 21, 1945

2,383,191

UNITED STATES PATENT OFFICE 2,383,191

APPLICATION OF CERAMIC COLOR

Eugene Hardesty, New Brighton, Pa., assignor to Fuller Label & Box Company, Pittsburgh, Pa., a corporation of Pennsylvania Original application August 30, 1941, Serial No. 409,105. Divided and this application January 22, 1945, Serial No. 573,998

3 Claims. (Cl. 117—13)

My invention relates to the decoration of ceramic ware and related products of the ceramic industry, including articles made of glass, china, pottery, enamelware and the like. The invention contemplates a novel method by which color ornamentation, or analogous surface alteration, may be applied directly to the ware or indirectly to it by application first to some transfer medium such as decal paper or equivalent sheet material, or to a screen of silk, copper wire or the like. This application is a division of my application Serial No. 409,105, filed August 30, 1941.

Primary objects of the invention are to improve the quality of the decoration and to reduce the costs of the decorating operations.

In the best prior art methods known to me, it is customary to apply directly to the ware, or to an appropriate transfer sheet of any one of the types above indicated, a coating of some adhesive medium, such as decal varnish, dextrine gumming or the like, conforming exactly to the area intended to be colored. A suitable ceramic color or oxide, including some appropriate frit, is then dusted over the sheet or ware and is retained thereby in the coated areas only. The capacity of the coating to retain the applied dust is limited, and the results obtained upon subsequent firing have been unsatisfactory by reason of paleness and/or unequal distribution of the color. Attempts have been made to overcome this difficulty by rubbing or wiping the dust into the adhesive coating, but the results have not been commercially successful because it has been impossible to cause a layer of adhesive coating of the required thinness to hold ceramic color dust in sufficient quantity or uniformity of distribution. It has also been attempted in the case of colors requiring an unusually heavy deposit to apply successive layers of adhesive coating, each with its own layer of embedded ceramic color, but this has caused blistering during the firing operation resulting from the bubbling of gases from the lower layers through the upper layers.

I have discovered that a single layer of conventional printed adhesive can be caused to retain an entirely adequate depth of ceramic color dust if the dust be worked down into the adhesive coat by comparatively rapid vibration of a brush or analogous applicator surface, and/or of the object or sheet itself.

Transfer sheets and ware bearing the unprecedentedly deep layer of ceramic color dust produced by practice of the present invention result in a finished product having remarkably deep color uniformly distributed and entirely devoid of blisters.

An embodiment of the invention is illustrated in the accompanying drawings which depict a form of mechanism that has been found satisfactory in actual operation and which will sufficiently illustrate the broad principles of the invention.

In the drawing,

Figure 1 is a side elevation of a device, in inoperative position, for performing the methd in the application of ceramic color direct to ware, and Fig. 2 is a similar view, partially in section, illustrating the device in operative position.

For purposes of illustration the ware upon which color is deposited in accordance with my improved method is here shown as a plate or flat dish. As shown in Fig. 1, a suitable device for performing the method may comprise a stationary frame consisting of four vertical posts 30 upstanding at the corners of an imaginary rectangle from a bed 31 and connected by spaced superposed plates 32 having aligned openings loosely receiving the two or more bars 34 of a movable frame. This movable frame terminates at its bottom in a brush backing 35, mounting a brush or pad 36, and terminates upwardly in a horizontal plate 37 on which is securely mounted a vibrator element 38, here shown as of the electrically energized type.

Upwardly and downwardly projecting pins 39 extend from the lower and upper rigid frame plates 32 respectively and coil springs 40 encircle these pins and react between the plates 32 and a floating equalizer plate 41 fixedly secured to rods 34. A bail or handle 42 is secured to the vibrator bed plate 37, by which the vibrating frame may be elevated as a unit from the ware 43 which in use of the device is positioned on the stationary bed 31 directly below the brush 36. Gravity latches 44 swing from the vibrator bed 37 to the upper stationary plate 32 and hold upper springs 40 compressed and the brush in elevated position whenever the handle 42 is manually pulled to its upper limit, which is done whenever ware 43 is to be inserted beneath the brush or withdrawn therefrom.

Pad supporting bars 34 are loosely received through openings on spaced main frame plates 32, the play of bars 34 obtained thereby permitting movement of the applicator or brush 36 in any direction with reference to the main frame and the ware supported thereby on which the color has been deposited. When in use the brush 36 is floatingly suspended in contact with the deposited color by means of equalizer springs 40 bearing in opposite directions on equalizer plate 41. These springs provide a reactionary force against the forces of the vibrator imparting movement to the applicator and, together with the play of rods 34 in their bearings, serve to permit vibratory movement of the applicator in all directions with reference to the fixedly positioned ware 43.

As has been made apparent from the foregoing description of the embodiment illustrated in the drawing, the floating or spring suspension of the vibrator and applicator surfaces with reference to the surface on which the color has been deposited obtains relative vibratory movement in all directions between the two surfaces.

In the use of this device the ware is directly printed or otherwise coated with the bonding medium and a liberal quantity of ceramic color is dusted thereon. The ware is inserted in the device, latches 44 are swung outwardly and the vibrator is set in motion. The applicator pad or brush vibrates at a rate of not less than 400 vibrations per minute and preferably not in excess of 7600, and thus embeds a very considerable quantity of the color material down into the coating on the ware to a depth hitherto believed impossible of attainment. The ware is then removed from the device, the unattached color is dusted off of it, and the ware is fired in the usual manner.

It will be understood that vibrating elements other than the electric devices herein disclosed by way of exemplification may be used. It is also to be understood that the work to be ornamented may be of any customary shape and character of surface, and that the bonding medium, ceramic color and other materials use in practicing the invention may be any which are well known in the art.

In all mechanical embodiments of the invention, and in the practice of the method, it is immaterial whether the ware or sheet surface to which the color is to be applied be vibrated or be restrained against vibration, it being necessary only that the ware or sheet and the applicator, e. g., the pad or brush disclosed in the illustrative embodiment, be relatively vibrated. Accordingly I contemplate variations of the illustrated mechanisms in which the work will be vibrated and the applicators will be restrained against vibration.

What I claim is:

1. In the method of applying ceramic color to a surface prepared with an adhesive coating, the steps which comprise depositing ceramic color on such surface and then embedding the color in the coating by contacting the deposited color with an applicator and effecting relative vibration between said applicator and said surface at not less than substantially 400 vibrations per minute in all directions.

2. In the method of applying ceramic color to a surface prepared with an adhesive coating, the steps which comprise depositing ceramic color on such surface and then embedding the color in the coating by applying to the deposited color an applicator surface and causing said applicator surface to vibrate relative to the surface bearing said color deposit at not less than substantially 400 vibrations per minute in all directions.

3. In the method of applying ceramic color to ceramic ware prepared with an adhesive coating, the steps which comprise depositing ceramic color on the coated portion of said ware and then embedding the color in the coating by applying to the deposited color an applicator surface and relatively vibrating said ware and surface in all directions at not less than substantially 400 vibrations per minute.

EUGENE HARDESTY.